June 3, 1941.  M. P. CHAPLIN  2,244,486
MOLDED PULP ARTICLE
Filed Nov. 30, 1936  3 Sheets-Sheet 1

Inventor,
Merle P. Chaplin

June 3, 1941.   M. P. CHAPLIN   2,244,486
MOLDED PULP ARTICLE
Filed Nov. 30, 1936   3 Sheets-Sheet 2
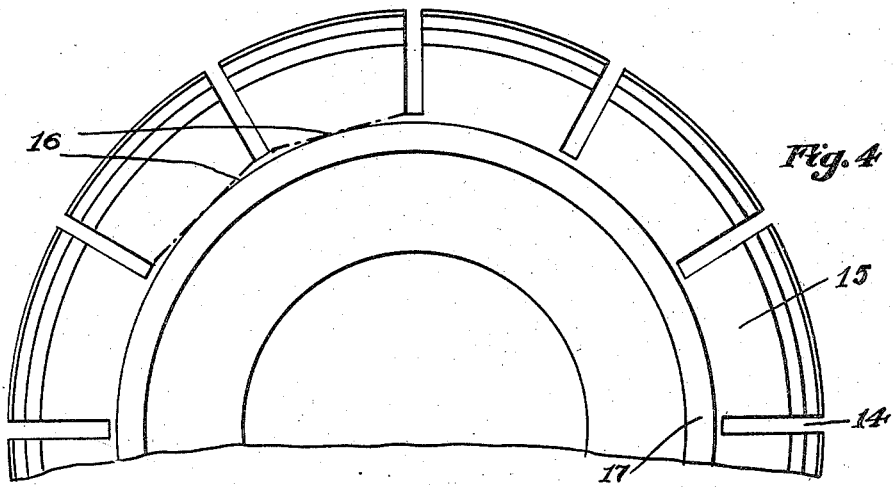
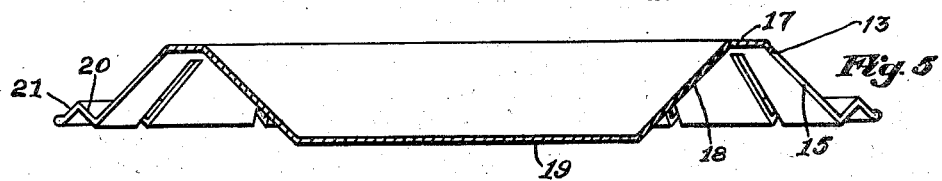
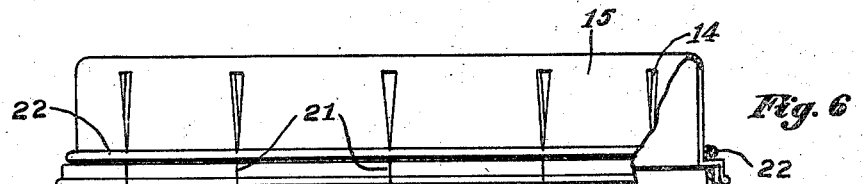
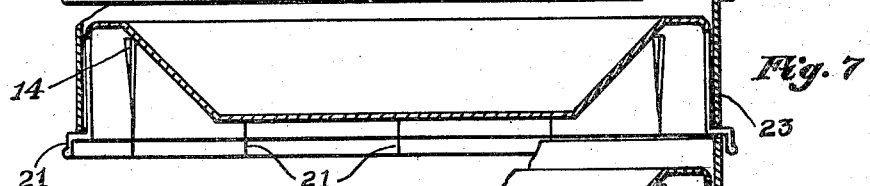
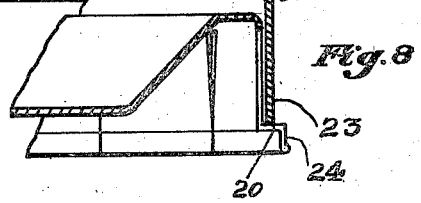
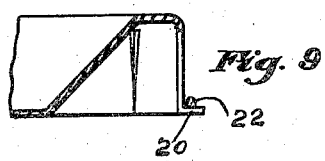
Inventor,
Merle P. Chaplin June 3, 1941.  M. P. CHAPLIN  2,244,486
MOLDED PULP ARTICLE
Filed Nov. 30, 1936  3 Sheets-Sheet 3

Inventor,
Merle P. Chaplin

Patented June 3, 1941

2,244,486

UNITED STATES PATENT OFFICE 2,244,486

MOLDED PULP ARTICLE

Merle P. Chaplin, Portland, Maine, assignor to Chaplin Corporation, South Portland, Maine, a corporation of Maine Application November 30, 1936, Serial No. 113,308

4 Claims. (Cl. 229—2.5)

This invention relates to a molded pulp article and a method of making an article which may be reshaped for use.

Manufacturing methods ordinarily used for the production of molded pulp articles require that these articles have tapering or flaring sides, this being necessary both for the purpose of manufacture, and also that these articles may be nested for compact shipment. Such requirements preclude having an article with vertical or perpendicular sides and in many cases it necessitates that the article be made larger or of greater area than actually required for the purpose intended.

These objections and limitations are largely avoided and eliminated by the article of my invention which is illustrated by the following figures and which illustrations show its method of manufacture and the possible forms of the reshaped article.

Fig. 4 shows a part plan view of one form of the molded article.

Fig. 5 shows a sectional view through the center of the article of Fig. 4.

Fig. 6 shows the article of Figs. 4 and 5 after it has been reshaped to have vertical sides.

Figs. 7 and 8 show a form or article shape which together with its enclosing band permits the reshaped articles to be stacked one above the other.

Fig. 9 shows a modified form of rim section after the molded article has been reshaped.

Figure 3:
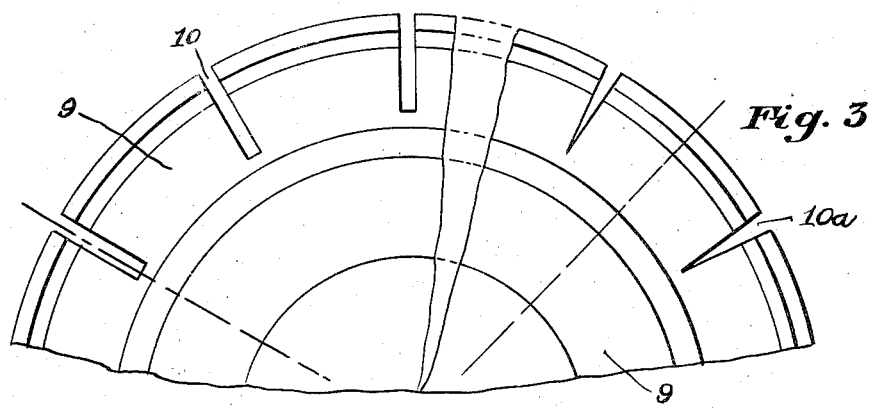
Fig. 3 shows a plan view of a part of a die which cooperates with the die of Fig. 2 to press the molded article, and to remove it from the die on which it was molded.

The article is molded on a perforated die 1 which die is covered with a fine mesh wire screen 2. The die 1 is mounted on a holder 5. Between the holder and die is formed a chamber 6. When the die and holder are immersed in a mixture of pulp fibres and water or other liquid, vacuum is applied to chamber 6 through pipe 8 causing the liquid of the pulp mixture to pass through the fine wire screen and through the perforations in the die 1 into the chamber 6 being drawn off through pipe 8. The fibres of the pulp mixture are retained on the screen being deposited in a reasonably uniform layer over the contour of the die as indicated at 3.

The fine wire mesh 2 is held in place on die 1 by means of a clamping or defining ring 4 which ring defines the periphery of the formed article 3. The article used for purposes of illustration is a round container or dish consisting of a bottom section 19 (Fig. 5), a flaring enclosing section 18 and a rim section 17. Ordinarily the defining ring 4 determines the periphery or outside limit of the article itself this portion on the article herein illustrated being at the outermost portion of the rim 17 or at point 13, Fig. 5.

My invention consists in part of adding a section to the rim 17 beyond point 13 which section is indicated at 15 in Figs. 4 and 5. This extra rim section 15 is made flaring or at an angle to the normal rim section 17 in order that it will not increase the space required for these articles when they are nested or packed for shipment.

As illustrated in Fig. 5 the extra rim section 15 is made at about the same angle or inclination as the inner section or wall 18 of the container itself. This angle or inclination of this section can be varied as necessary or desirable and the figures herein are illustrative of one design only which is not to be taken as limiting the invention to this particular shape or this particular article.

As the useful portion of the container or article normally ends at the flange or rim section 17 any outward projection or increase in diameter beyond this rim 17 or beyond the point 13 takes up excess space which condition is frequently objectionable.

In order to conserve space when the article or container is in use as well as to provide a rigid vertical upstanding rim portion as will be hereinafter described more in detail I provide on the defining ring 4 (Figs. 1 and 2) a plurality of fingers or rib sections 7 and 7a. These fingers or ribs extend inwardly over a portion of the extra rim section 25 on the die 1 and clamp tightly over certain portions of the fine wire screen 2 covering the die 1 as is indicated in Fig. 2. These fingers effectively prevent the deposition of pulp fibres on those portions of the screen 2 covered by the fingers 7 or 7a and thus effect the molding of a plurality of notches 10 or 10a in the extra rim section 15 of the article. These notches are shown in plan view in Fig. 4 and in sectional view in Fig. 5.

Figure 1:
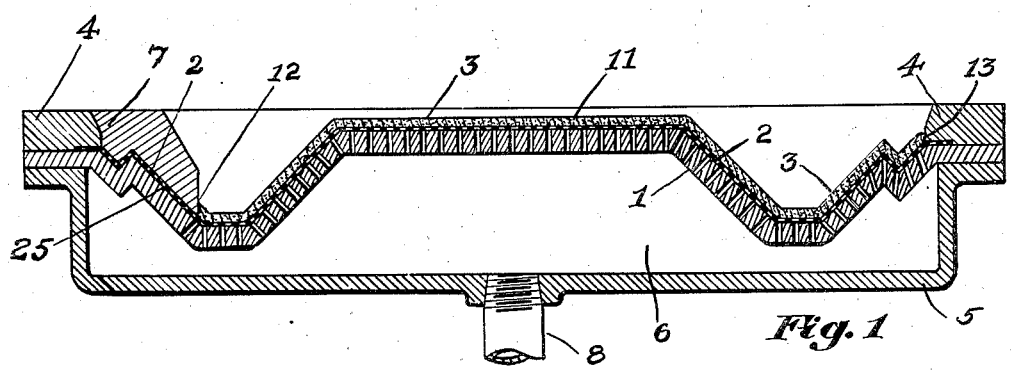
Fig. 1 shows a sectional view of a foraminous die for forming or molding the article.
Figure 2:
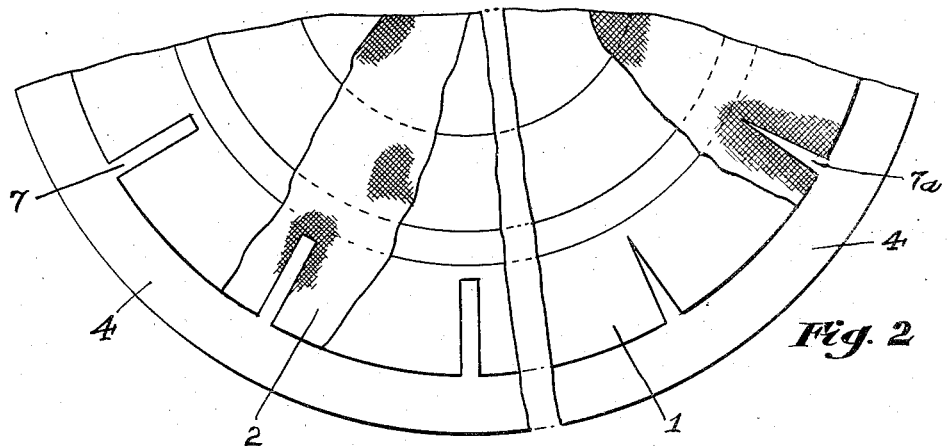
Fig. 2 shows a plan view of a part of the die on which the article is molded, and the fingers or projections over the die by means of which openings are made in the article.

Cooperating with the die 1 of Fig. 1 and the article 3 which has been molded over the wire screen secured to this die is a second cooperating die 9 shown in plan view in Fig. 3. The surface of this die conforms to the outer surface of the article 3 formed on the die 1 and the slots 10 in the periphery of this die fit and coact with the fingers 7 on the defining ring 4. This cooperating die 9 acts together with the molding die 1 in a manner well known in the pulp molding art to compress the article 3 on the forming die and to remove it from that die in order that a subsequent article may be formed. The cooperating die 9 has a further purpose of compressing the molded pulp about the fingers 7 or 7a on the defining ring 4 and completing the operation of molding the slot 14 in the extra or extending rim section 15 of the article.

The molded article 3 after being removed from die 1 by cooperating die 9 may be dried directly on die 9 or it may be removed from this die to a drying oven or other means for evaporating the moisture remaining in the formed pulp article.

It will be noted in Figs. 2 and 3 that there is indicated two shapes or types of fingers 7 and 7a and the cooperating die slots 10 and 10a. The substantially square end-fingers 7 and slots 10 in the left hand portion of Figs. 2 and 3 indicate one type, and the pointed fingers 7a and slots 10a in the right hand portion of these two figures indicate another type. The purpose of these will be explained more in detail later.

Referring to Figs. 4 and 5 it will be noted that the article which has been molded on die 1, compressed by die 9 and subsequently removed from die 1 by die 9 has the simple container and rim sections of a conventional article plus an extended rim section 15 which section has a plurality of notches or slots 14. When the articles are nested for shipment and prior to their actual use, this extra or extended rim section 15 is in the position in which it was molded and as indicated in Fig. 5.

In use this extra rim section 15 is reshaped inwardly as indicated in Figs. 6, 7 and 8. The slots 14 in the extra rim section 15 form in effect a plurality of individual extended rim sections which when reshaped inwardly as illustrated in Figs. 6, 7 and 8 bend or fold on lines 16 as shown in Fig. 4. When reshaped inwardly, the outermost portion of the notches 14 are closed and the individual sections 15 meet or abut each other as shown at 21 in Figs. 6 and 7. This re-unites or completes a new and continuous rim section as shown in Figs. 6, 7 and 8, the reunited rim section 15 being held in this new position by a retaining ring 22 (Fig. 6) or band 23 (Figs. 7 and 8). This reshaping of the extra rim section 15 brings this section of the article substantially vertical effecting economies in space taken by the article when in use and greatly reinforcing and strengthening the rim or edge portion. If desired it may form an extra or additional support for the container by virtue of the fact that the extra rim section 15 can rest on the table or support on which the container may be placed.

This extra rim section also has another purpose indicated more clearly in Figs. 7 and 8. It will be noted that the sections 15 are held in reunited position by a band 23 which extends completely around the rim or periphery of the article. This band may be made slightly deeper than the article itself so that it will extend somewhat above the rim 17 as indicated in Figs. 7 and 8. When so made and used the bottom or the extreme end of the extra rim section 15 has an angle shaped formation indicated at 20-24, Fig. 8. The portion 20 is so molded that it will, when reshaped, extend outwardly in a horizontal direction as shown in Fig. 8, and molded integral with this portion is a downwardly projecting portion 24 which will assume a substantially vertical position when the rim section 15 is reshaped as illustrated. These sections 20 and 24 form in effect a recess on the bottom of the reshaped rim section 15 into which recess the enclosing bands 23 project which permits containers or articles in use to be stacked one above the other without damage to any material or product which may be contained in the article itself. Each reshaped article is effectively locked in position to one either above or below. It will readily be observed that the band 23 supports each successive container directly over itself effecting an extremely strong and rigid support so that any reasonable number (only 2 shown) of containers may be stacked one above the other even though these articles contain a product of considerable weight.

It will be noted that two types of retaining rings or bands are shown one being a wire or string type shown at 22 (Fig. 6) and the other being the flat band type already described and illustrated in Figs. 7 and 8.

There is illustrated in Fig. 9 a modified shape at the extreme end of section 15 in which the downwardly extending section 24 has been omitted and the section 20 on the end of the rim section 15 when reshaped into vertical position is brought substantially on a line with the bottom of the container so that the rim section and the bottom of the container both contribute to the support of the article and contents therein.

It is obvious that a wide variety of reshaped articles or containers can be produced by the methods herein described. As illustrative of another use of this method wherein the useful capacity of the container or article is increased without adding to its excess space requirements reference is made to Figs. 10, 11 and 12.

Figure 10:
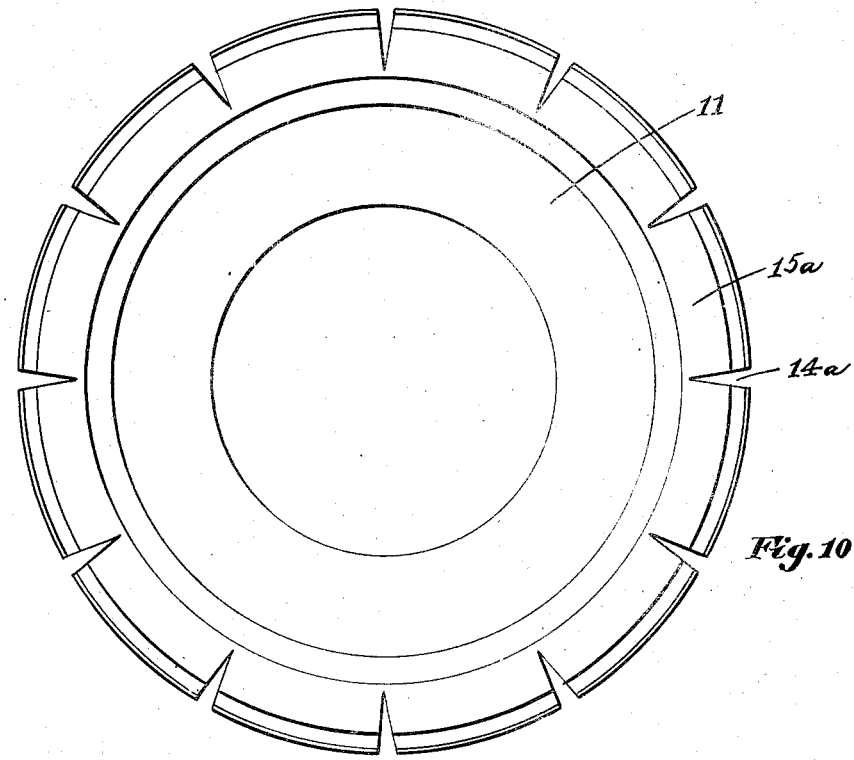
Fig. 10 shows another form of a molded article which may be reshaped.
Figure 11:
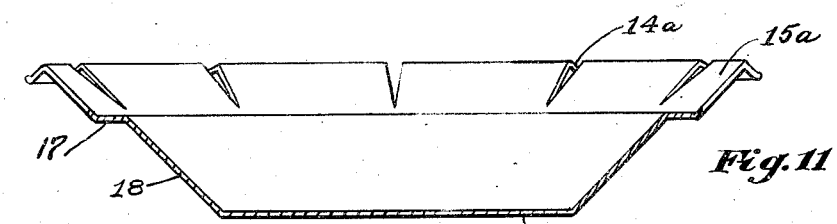
Fig. 11 shows a sectional view through the article of Fig. 10.

This article has a central section similar to that previously discussed consisting of a bottom 19, an upwardly and outwardly flared wall section 18 and a rim section 17. Instead of attaching an extra rim section flaring downwardly as illustrated in Fig. 5 the section as illustrated in Figs. 10 and 11 has its extra rim section flaring upwardly and is indicated at 15a. It will also be noted that in this case the notches formed in the extra rim section 15a are V-shaped as shown at 14a this being accomplished by the use of the defining ring extensions 7a and the cooperating die notches 10a illustrated in the right portion of Figs. 2 and 3.

Figure 12:
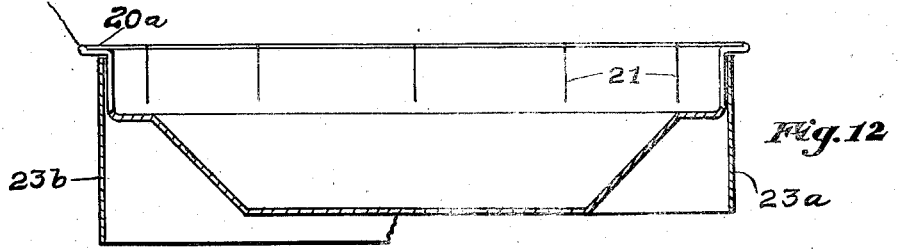
Fig. 12 shows the article of Figs. 10 and 11 after it has been reshaped.

When the extra rim section 15a illustrated in Figs. 10 and 11 are reshaped as indicated in Fig. 12, the notches 14a are closed for their entire length as indicated at 21, Fig. 12 so that in effect the depth or height of the container is greatly increased and made useful without the necessity of having a widely flared section for this purpose as would be the case if the rim 18 had continued upwardly in a flaring direction.

It is of course obvious that the flange section 17 can be entirely eliminated effecting a further decrease in the space taken by the reshaped container without greatly reducing its capacity. In a reshaped container of this type the band indicated in Fig. 12 may be of the height indicated at 23a where the bottom of the band is on a line with the bottom of the container, or the band may be made somewhat wider as indicated at 23b so that the entire container is supported on the band. In this case it is possible to stack filled containers one above the other, the lower edge of the band 23b resting on the outwardly projecting section 20a of the reshaped rim section, which section can be provided with a slight upward portion 24a to facilitate the stacking of filled containers and the locking or holding of each container relative to the one above or below.

As heretofore stated, the articles herein shown are to be taken only as illustrative of some of the shapes or types of containers which can be made by the methods disclosed, and these methods are not to be construed as limiting to the particular article or articles herein illustrated. The methods herein disclosed namely: the use of contoured suction dies on which an article is moulded from a liquid pulp mixture, and the moulded pulp article thereby produced, are inseparable as to method and result. Wherever the term "molded pulp article" is used it definitely refers to an article produced by the methods herein disclosed and described.

What I claim and desire to secure by Letters Patent is:

1. A fibrous container comprising a bottom, an outwardly and upwardly flared wall encompassing said bottom, a flange integral with said flared wall, said flange having slots extending from the edge thereof to points adjacent said flared wall and dividing the flange into spaced sections having reverse bends at the outer edge thereof and which sections when a tensioning member is applied thereto are drawn inwardly to a substantially vertical position wherein the open ends, at least, of the slots are substantially closed so that the flange portion presents a substantially unbroken outer supporting edge, a tension member for retaining said sections against outward movement, said tension member comprising a band of greater width than the overall height of the container, positioned to encompass said sections and to extend substantially beyond one end of the container for seating against the similar reversely bent edge portions of a duplicate assembly.

2. A container unit for a food product, comprising a fibrous plate or similar container having a central article-supporting portion and an integral rim, said rim having a plurality of spaced slots extending inwardly from its outer edge and sub-dividing the rim into a plurality of contiguous segmental portions which if unrestrained would normally extend angularly outwardly from the central portion, and an external restraining member surrounding said rim and holding said segmental portions in a substantially vertical position wherein the open ends of said slots are brought into abutment with each other to furnish a continuous rigid supporting edge, said rim terminating in an angular formation presenting a horizontal portion and an offset vertical portion surrounding and depending from said horizontal portion, the upper surface of said horizontal portion providing a landing on which the lower edge of the restraining member of said unit may bottom and the under surface of said horizontal portion providing a support adapted to rest on a subjacent container unit, and said vertical portion aiding in restraining said unit against lateral movement when supported by said subjacent unit.

3. A container unit for a food product, comprising a fibrous plate or similar container having a central article-supporting portion and an integral rim, said rim having a plurality of spaced slots extending inwardly from its outer edge and sub-dividing the rim into a plurality of contiguous segmental portions which if unrestrained would normally extend angularly outwardly from the central portion, and an external restraining member surrounding said rim and holding said segmental portions in a substantially vertical position wherein the open ends of said slots are brought into abutment with each other to furnish a continuous rigid supporting edge, said rim terminating in a reverse bend which, when the rim is re-shaped to said substantially vertical position, provides a seat for the stacking assembly of said unit with a subjacent unit and aids in restraining the stacked units of said assembly against lateral displacement with respect to each other.

4. A fibrous pulp container, comprising a bottom, an outwardly and upwardly flared wall encompassing said bottom, a flange integral with said flared wall, said flange having slots extending from the edge thereof to points adjacent said flared wall and dividing the flange into spaced sections having reverse bends at their outer edges, a tension member encompassing said sections for drawing said sections inwardly to a substantially vertical position wherein the open ends at least of the slots are substantially closed so that the flange presents a substantially unbroken supporting edge, the height of said flange in its vertical position being greater than the depth of said bottom so that, when the supporting edge of said unit is rested upon a subjacent unit, said bottom will be spaced from an article of food in the subjacent unit.

MERLE P. CHAPLIN.